United States Patent [19]

Hansen

[11] Patent Number: 5,385,429
[45] Date of Patent: * Jan. 31, 1995

[54] SYNTHETIC COVER FOR WASTE

[75] Inventor: David L. Hansen, Averill Park, N.Y.

[73] Assignee: Landfill Service Corporation, Apalachin, N.Y.

[ * ] Notice: The portion of the term of this patent subsequent to Nov. 10, 2009 has been disclaimed.

[21] Appl. No.: 203,948

[22] Filed: Feb. 28, 1994

Related U.S. Application Data

[63] Continuation of Ser. No. 81,566, Jun. 23, 1993, which is a continuation-in-part of Ser. No. 966,269, Oct. 26, 1992, Pat. No. 5,275,908, which is a continuation-in-part of Ser. No. 674,864, Mar. 25, 1991, Pat. No. 5,161,915.

[51] Int. Cl.$^6$ ................................................ B09B 1/00
[52] U.S. Cl. ................................ 405/129; 405/128; 405/264; 405/266; 588/252
[58] Field of Search .............. 405/128, 129, 258, 263, 405/264, 266; 47/9; 106/706, 718, 901; 588/249, 252

[56] References Cited

U.S. PATENT DOCUMENTS

| | | | |
|---|---|---|---|
| 2,802,303 | 8/1957 | Weeks | 47/9 |
| 3,466,873 | 9/1969 | Present | 61/35 |
| 3,635,742 | 1/1972 | Fujimasu | 106/287 |
| 4,028,130 | 6/1977 | Webster et al. | 106/120 |
| 4,297,810 | 11/1981 | Hansford | 47/9 |
| 4,354,876 | 10/1982 | Webster | 106/85 |
| 4,369,054 | 1/1983 | Shinholster, Jr. et al. | 71/25 |
| 4,374,672 | 2/1983 | Funston et al. | 106/97 |
| 4,519,338 | 5/1985 | Kramer et al. | 118/305 |
| 4,790,691 | 12/1988 | Freed | 405/263 |
| 4,950,426 | 8/1990 | Markowitz et al. | 252/633 |
| 4,973,196 | 11/1990 | Fuhr et al. | 405/129 |
| 5,040,920 | 8/1991 | Forrester | 405/129 |
| 5,054,406 | 10/1991 | Judd | 110/346 |
| 5,161,915 | 11/1992 | Hansen | 405/129 |

FOREIGN PATENT DOCUMENTS 3347377 12/1983 Germany .

*Primary Examiner*—David H. Corbin
*Attorney, Agent, or Firm*—Heslin & Rothenberg

[57] ABSTRACT

A synthetic cover for waste piles may be formed from a mixture of liquid, binder, and fibers. These constituents may be mixed and applied to cover a waste pile. The cover will harden to minimize odor and affinity to birds, flies and other insects. The liquid may include water; the binder may include cement kiln dust with or without bentonite, or portland cement with flyash or stone dust. The fibers may comprise shredded paper or wood.

23 Claims, No Drawings

SYNTHETIC COVER FOR WASTE

CROSS-REFERENCE TO RELATED APPLICATIONS

This application is a continuation of U.S. patent application Ser. No. 081,566 filed on Jun. 23, 1993, which is a continuation-in-part of U.S. patent application Ser. No. 966,269 filed on Oct. 26, 1992, now issued as U.S. Pat. No. 5,275,908, which is a continuation-in-part of U.S. patent application Ser. No. 674,864 filed on Mar. 25, 1991 now issued as U.S. Pat. No. 5,161,915.

BACKGROUND OF THE INVENTION

This invention relates to the field of waste management. More particularly, the invention relates to a synthetic cover for waste.

During the processing or storage of waste, waste may be concentrated into a particular area within landfills, compost windrows, sludge heaps, etc. When waste is concentrated into piles, it is often necessary to cover waste piles to minimize their odor, prevent fires, prevent the movement of the waste, and prevent vectors such as birds, flies, and other insects from feeding thereon. Typically, waste is covered by spreading a layer of dirt over the exposed portions of the waste. For example, in landfills, piles of municipal solid waste are covered by spreading a layer of dirt thereon. The thickness of the layer depends upon the length of time the pile is to remain covered. For example, a waste pile which is to be covered for a short period of time, for example, overnight, may require, for example, a six-inch layer. However, when it is necessary to cover a waste pile for a relatively longer period of time, a twelve-inch layer may be required. For a permanent cover generally a layer of dirt of approximately two foot thickness or more may be required.

One problem associated with the use of soil and dirt is that large quantities are necessary to cover waste. For this reason, there is a high loss of available volume for waste thereby significantly reducing the amount of waste which can be concentrated into a pile. This is particularly true in landfills where waste piles are stacked upon other waste piles having daily soil covers separating each waste pile. Since there is concern over the effective space available in existing landfills, it has become necessary to maximize the volume available for waste. One way of accomplishing this is to minimize the volume of dirt necessary for covering the waste piles.

Besides soil, certain chemical foam products have been developed and used to cover waste. However, these products are relatively expensive and very difficult to apply. Also, the safety of these chemical formulations has been questioned and their effect upon ground water quality remains unknown.

It is therefore an object of the present invention to provide a cover for waste which takes up a minimal amount of volume.

It is also an object of the present invention to provide a cover for waste which is derived from readily available, preferably recycled, materials.

It is also an object of the present invention to provide a cover for waste which causes no harm or threat to the environment.

It is also an object of the present invention to provide a cover for waste which is easily applied.

SUMMARY OF THE INVENTION

The aforementioned objects are achieved by utilizing the synthetic cover for waste piles in accordance with the present invention.

The invention includes a mixture for creating a synthetic cover for waste piles. The mixture comprises a liquid, a binder, and fibers. The invention also incorporates a method of making a synthetic cover for waste piles comprising mixing fibers with a liquid to form a pre-mixture, and mixing a binder reagent to form a final mixture, wherein the final mixture has a thick-viscous consistency which will harden after it is applied to cover waste piles.

The mixture may comprise approximately thirty percent to sixty percent by weight liquid, approximately forty percent to seventy percent by weight binder, approximately up to ten percent by weight fibers.

The liquid may comprise water, landfill leachate, and/or industrial waste water. The binder may comprise cement kiln dust; and/or cement kiln dust with bentonite. The amount of bentonite may be up to twenty percent, by weight of the total mixture. Also, the binder may comprise fly ash, and/or fly ash with portland cement. The amount of portland cement may comprise about five to twenty five percent of the mixture, by weight. The fibers may include cellulose such as shredded paper and/or finely shredded wood fibers. The fibers may also comprise plastic fibers such as polyethylene terephthalate fibers.

The invention also incorporates a method of covering waste piles comprising mixing a binder, fibers, and liquid together to form a mixture; coating a waste pile with the mixture; and allowing the coating to harden as a cover on the waste pile. The mixing of the binder, fibers and liquid may comprise mixing fibers into a liquid, and thereafter, adding the binder thereto and mixing the binder therein. Mixing the fibers, liquid and binder may occur within a mixing tank. The coating of a waste pile with the mixture may comprise spraying the mixture on the waste pile.

DETAILED DESCRIPTION OF THE PREFERRED EMBODIMENTS

The synthetic cover for waste piles in accordance with the present invention may be used to cover a variety of waste piles such as, for example, composte windrows, sludge heaps, and municipal solid waste piles in landfills. However, implementation of the synthetic cover for waste piles will be described in conjunction with its use to cover municipal solid waste piles in landfills.

Since municipal solid waste piles in landfills are relatively large, it is necessary to cover a large area of the surface of these piles using the synthetic cover in accordance with the present invention. Accordingly, it is necessary to provide an apparatus which is capable of applying the synthetic cover to a large area and providing a system which is capable of generating and applying large volumes of the material used to form the synthetic cover. It has been found that commercial equipment available from Landfill Service Corporation of Apalachin, N.Y. may be used to mix and apply the ingredients ("constituents") necessary to produce the synthetic cover in accordance with the present invention.

The synthetic cover for waste piles in accordance with the present invention is mixed by filling a mixing tank with a predetermined amount of liquid constituent such as water, landfill leachate, or industrial waste water. The proper amount of cellulose fibers and plastic fibers are then loaded into the mixer containing the liquid. Optionally, a coloring agent such as an "Earthtone" mortar dye available from Landfill Service Corporation may be added if desired. The agitator is activated such that the cellulose fibers and plastic fibers are mixed with the liquid. Typically, it is necessary to activate the agitator for approximately a minute or longer to adequately mix the liquid, cellulose and plastic fibers together. The binder reagent is then placed into the mixer where it is thoroughly agitated with the liquid, cellulose fibers and plastic fibers.

The mixing time necessary to yield a mixture with the proper consistency may vary depending upon the percentage of each constituent added to the mixture. Also, weather conditions such as temperature and humidity may affect the length of time that the binder must be mixed with the liquid, cellulose fibers and plastic fibers. However, the materials should be mixed until the mixture has a thick, viscid, "milk shake" type consistency.

When the mixture is properly agitated, a spray applicator is moved to the working area and the mixture is sprayed onto the waste pile surface using a motion similar to spray painting. The mixture is sprayed in such a manner that a uniform layer approximately one-eighth to one-quarter of an inch thick exists. After the entire surface area of the waste pile has been sprayed in this manner, the material will harden if undisturbed. When the mixture is applied at the proper consistency it will resemble a clotty coagulant type of material which will adhere to the waste pile and cohere to itself. Typically, the material will dry and harden to resemble a stucco-type finish within 24 hours. After the entire waste pile has been covered, the applicator and mixing unit must be cleaned out thoroughly when not in use so that the mixture remaining within the apparatus does not harden. Typically, water will suffice in cleaning the apparatus. For convenience, cleaning may occur directly on the landfill itself.

The liquid portion of the mixture may include water, landfill leachate, and/or industrial waste water. Any quality of water is acceptable for use in the present invention, including turbid, polluted and/or non-potable waters as well as landfill leachate and industrial waste water. The amount of liquid should be between 30 and 60 percent, by weight, of the total mixture. The binder used in the mixture may include cement kiln dust, fly ash with portland cement, stone dust with portland cement, and/or cement kiln dust with bentonite. The amount of binder in the total mixture should be between 40 and 70 percent, by weight. The cellulose fiber may include shredded newspaper, shredded mixed paper, and/or finely shredded wood fiber. The total amount of the cellulose fiber in the mixture should be between ½ and 10 percent, by weight. The plastic fiber which may be used within the mixture includes polyethelene terephthalate (PET) fibers or other plastic fibers including recycled plastics. The amount of plastic fiber used is in the mixture may be up to two percent, or less, of the mixture by weight.

The exact percentage of each constituent, (i.e. liquid, binder, cellulose fibers, plastic fibers) used to create the mixture may depend upon the weather conditions which exist during mixing and application of the synthetic cover and upon the particular type of waste being covered. For example, at relatively higher temperatures, the amount of liquid used in the total mixture will be higher than the amount of liquid used at lower temperatures. However, the total amount of water used within the mixture should be between 30 and 60 percent despite such weather variations. Also, if there is a high degree of rainfall which will contact the mixture, then the amount of water used should be decreased accordingly.

The amount of binder used in the mixture will also be higher on a cold day compared to the amount of binder used in the mixture on a hot day. However, despite variations in rainfall and temperature, the amount of binder should remain between 40 and 70 percent of the total weight of the mixture. The amount of cellulose fiber used is also dependent upon rainfall. On a day where the rainfall is present, the amount of cellulose fiber should be relatively higher than the amount used on a dry day. Accordingly, the higher the rainfall, the higher the amount of cellulose fiber used. The amount of plastic fiber used in the mixture is not dependent upon changes in weather conditions.

The constituent used in liquid portion of the mixture may include water, landfill leachate, and/or industrial waste water. Although either of these three types of liquids will suffice, water is the preferred liquid constituent because it is easily available. Many different qualities of water may be used including turbid, polluted and non-potable water. Industrial waste water may also be used. These waste waters may be effective as a liquid constituent provided that they do not contain pollutants which react with other constituents during mixing. Landfill leachate, created by percolation of water through the buried refuse at a landfill, may also be used as a liquid constituent. Since disposal and treatment of landfill leachate are troublesome and expensive, use of landfill leachate may provide an effective method of its disposal. It should be noted that use of landfill leachate and industrial waste water as the liquid constituent may require increased safety precautions.

The constituents which may be used as cellulose fibers include shredded newspaper, mixed types of shredded paper and/or shredded wood fiber. These cellulose fiber constituents may be used separately or in various combinations. Preferably, shredded newspaper or shredded mixed waste paper should be used because of its absorbability and availability. Newspapers may be shredded into particles, preferably less than one-half inch in any dimension. In order to ensure proper liquid content in the total mixture, the shredded newspaper should not have more than a 6 percent, by weight, moisture content prior to mixing with the liquid constituent. Also, other finely shredded mixed papers useable as the cellulose fiber constituent should preferably be less than one-half inch in any dimension. These mixed paper fibers may include shredded magazines, phone books, corrugated containers, junk mail, office paper, etc. These shredded mixed papers should also be less than 6 percent by weight moisture content prior to mixing. Shredded wood fibers may also be used as a constituent provided that the wood fibers are finely shredded. The shredded wood fiber must be in a string or hair-like shape such as fine excelsior. Wood chips are not satisfactory for use as the cellulose fiber constituent.

The constituents which may be used as plastic fibers include high density polyethelene, polyvinyl chloride as well as or other types of plastics shredded into thin hair-like fibers. These hair-like fibers should be between one-quarter to one-half inch in length. Polyethelene terephthalate fibers, such as PETROFLEX ® type 401 fiber which are hair-like in diameter and between one-quarter to one-half inch long in length are preferred as the plastic constituent useable in the present invention. These fibers are manufactured from recycled products such as plastic soda containers.

The constituents which may be used as binders in the present invention include Portland cement, cement kiln dust (CKD), fly ash, bentonite, or stone dust, or any combination of these. Cement kiln dust is the preferred binder used in the present invention. Cement kiln dust is captured during the manufacture of portland cement by air pollution control devices. Although the physical and chemical characteristics of cement kiln dust are much different than portland cement, cement kiln dust does bear a physical resemblance to portland cement. Although cement kiln dust is the preferred binder constituent, other mineral binders may be used. Also, bentonite may be added to any of the other binders to form the binder constituent. The bentonite enhances the smoothness and consistency of the mixture and also increases its tackiness and viscosity enabling it to better adhere to waste and cohere to itself. Typically, up to approximately twenty percent, by weight of the total mixture, of bentonite may be added. However, it is usually not necessary or required to add bentonite with the cement kiln dust as the binder constituent unless impermeability is desired.

Fly ash and portland cement may also be used as the binder constituent. Fly ash are fine solid particles of ashes, dust and soot which evolve from burning fuel. The amount of portland cement used with the fly ash should be approximately 5 to 25 percent by weight of the total mixture. In lieu of fly ash, stone dust, derived from commercial stone crushing operations, may be used along with portland cement as a binder constituent. Accordingly, the amount of portland cement used with stone dust should also be between 5 to 25 percent by weight of the total mixture.

Using the aforementioned materials as constituents will result in a mixture which may be applied, by spraying or another manner, to a waste pile to form a cover which will minimize odor and prevent vectors such as birds, flies and other insects from feeding off the waste.

TEST RESULTS

Test 1

A laboratory test was conducted utilizing the constituents and parameters shown in the following table.

| Constituent | Type | % age of Mixture by Weight | Weight |
| --- | --- | --- | --- |
| Liquid | Water | 45 | 125 gm |
| Binder | Cement Kiln Dust | 54 | 150 gm |
| Cellulose Fiber | Newsprint | <1.0 | 2.5 gm |
| Plastic Fiber | PETROFLEX ® type 401 Fiber | <.1 | .1 gm |

These amounts of constituents were mixed as discussed supra. The mixture was then applied as a cover on a small sample of refuse including paper, plastic and glass. The mixture was of a viscosity which properly adhered to the sample refuse.

Test 2

A field test was conducted utilizing the constituents and parameters shown in the following table.

| Constituent | Type | % age of Mixture by Weight | Weight |
| --- | --- | --- | --- |
| Liquid | Water | 39 | 1,000 lbs |
| Binder | Cement Kiln Dust | 59 | 1,530 lbs |
| Cellulose Fiber | Shredded Newspaper | 2 | 50 |
| Plastic Fiber | PETROFLEX ® type 401 Fiber | <.1 | 1 |

The constituent amounts were mixed as discussed supra and the mixture was sprayed onto municipal solid waste. The mixture hardened into a cover which withstood freezing temperatures and various weather conditions.

Although the invention has been disclosed in relation to the embodiments described herein, it is apparent that various modifications, substitutions equivalents and other changes may be utilized without departing in any way from the spirit of the invention. Any such modifications are intended to be within the scope of the invention as defined by the following claims.

What is claimed is:

1. A mixture for covering waste comprising the following constituents:
   approximately thirty percent to sixty percent, by weight, liquid;
   approximately forty percent to seventy percent, by weight, mineral binder;
   up to approximately ten percent, by weight, fibers; and
   wherein a mixture of the constituents forms a thick viscid slurry capable of being applied in a uniform layer of approximately a quarter of an inch to form a daily or interim cover.

2. The mixture for covering waste according to claim 1 wherein the liquid comprises water.

3. The mixture for covering waste according to claim 2 wherein the water comprises landfill leachate.

4. The mixture for covering waste according to claim 3 wherein the binder comprises cement kiln dust.

5. The mixture for covering waste according to claim 3 wherein the binder comprises bentonite.

6. The mixture for covering waste according to claim 5 wherein the amount of Bentonite in the mixture comprises approximately one to twenty percent, by weight.

7. The mixture for covering waste according to claim 1 or 2 wherein the binder comprises flyash.

8. The mixture for covering waste according to claim 7 wherein the binder further comprises portland cement.

9. The mixture for covering waste according to claim 8 wherein the amount of portland cement is approximately five to twenty five percent, by weight.

10. The mixture for covering waste according to claim 1 wherein the binder comprises stone dust.

11. The mixture for covering waste according to claim 1 wherein the fibers comprise shredded paper.

12. The mixture for covering waste according to claim 1 wherein the fibers comprise finely shredded wood fibers.

13. The mixture for covering waste according to claim 1 wherein the fibers comprises polyethylene terephthalate fibers.

14. A method of making a cover for waste comprising:

mixing fibers sufficient to prevent erosion with a liquid to form a pre-mixture; and mixing a binder reagent to form a final mixture, wherein the final mixture forms a thick viscuid slurry capable of being applied in a uniform layer of approximately a quarter of an inch to form a daily or interim cover.

15. The method of making a cover for waste according to claim 14 wherein the final mixture comprises:

about thirty to sixty percent, by weight, liquid;

about forty to seventy percent, by weight, binder; and up to about ten percent fibers.

16. The method of making a cover for waste according to claim 15 wherein the fibers are mixed with the liquid in a mixing tank.

17. The method of making a cover for waste according to claim 15 wherein the liquid comprises water.

18. The method of making a cover for waste according to claim 15 wherein the fibers comprise shredded paper.

19. The method of making a cover for waste according to claim 18 wherein the fibers further comprise plastic fibers.

20. The method of making a cover for waste according to claim 15 wherein the binder comprises cement kiln dust.

21. The method of making a cover for waste according to claim 19 wherein the binder comprises Bentonite.

22. The method of making a cover for waste according to claim 15 wherein the binder comprises portland cement.

23. The method of making a cover for waste according to claim 22 wherein the binder further comprises flyash or stone dust.

* * * * *